(12) United States Patent
Huang et al.

(10) Patent No.: US 8,059,434 B2
(45) Date of Patent: Nov. 15, 2011

(54) POWER CONVERSION DEVICE AND CONTROL METHOD THEREOF

(75) Inventors: Yung-Fu Huang, Miaoli County (TW); Yoshihiro Konishi, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 203 days.

(21) Appl. No.: 12/506,398

(22) Filed: Jul. 21, 2009

(65) Prior Publication Data

US 2010/0142233 A1    Jun. 10, 2010

(30) Foreign Application Priority Data

Dec. 8, 2008   (TW) ................................ 97147735 A

(51) Int. Cl.
*H02M 7/5387* (2007.01)
*H02M 7/5395* (2006.01)

(52) U.S. Cl. .......... 363/98; 363/17; 363/21.02; 363/132

(58) Field of Classification Search .................... 363/17, 363/21.02, 37, 97, 98, 131, 132
See application file for complete search history.

(56) References Cited

U.S. PATENT DOCUMENTS

| | | | | |
|---|---|---|---|---|
| 5,291,383 A | * | 3/1994 | Oughton | 363/17 |
| 2006/0098461 A1 | * | 5/2006 | Lee et al. | 363/17 |
| 2006/0171182 A1 | * | 8/2006 | Siri et al. | 363/131 |
| 2008/0062724 A1 | * | 3/2008 | Feng et al. | 363/17 |
| 2010/0135045 A1 | * | 6/2010 | Inoue | 363/17 |

OTHER PUBLICATIONS

Yatsuki, S., et al., "A Novel AC Photovoltaic Module System Based on the Impedance-Admittance Conversion Theory," 32nd Annual Power Electronics Specialists Conf., Vancouver, CA IEEE, Jun. 17-21, 2001, vol. 4., pp. 2191-2196.

* cited by examiner

*Primary Examiner* — Adolf Berhane
*Assistant Examiner* — Fred E Finch, III
(74) *Attorney, Agent, or Firm* — Thomas, Kayden, Horstemeyer & Risley, LLP

(57) ABSTRACT

A power conversion device is provided for converting a DC voltage to an alternating current corresponding to an AC voltage according to the AC voltage, which includes a power conversion unit and an output unit. The power conversion unit converts the DC voltage to a high-frequency current having two envelops corresponding to the waveform of the AC voltage. The output unit includes an inductive circuit, a full-wave rectifying circuit, an inverter circuit and a filter circuit. The inductive circuit provides two induced currents according to the high-frequency current, wherein one induced current and the high-frequency current are in phase, and the other induced current and the high-frequency current are in antiphase. The full-wave rectifying circuit full-wave rectifies the two induced currents. The inverter circuit alternatively transfers the two full-wave rectified induced currents, and thus output an output current. The filter circuit filters the output current to provide the alternating current.

20 Claims, 6 Drawing Sheets

US 8,059,434 B2

POWER CONVERSION DEVICE AND CONTROL METHOD THEREOF

This application claims the benefit of Taiwan application Serial No. 97147735, filed Dec. 8, 2008, the subject matter of which is incorporated herein by reference.

TECHNICAL FIELD

The invention relates in general to a power conversion device and a control method thereof, and more particularly to a power conversion device which converts a direct-current voltage to an alternating current corresponding to an alternating-current voltage according to the alternating-current voltage and a control method thereof.

BACKGROUND

As the technology develops, people have been gradually placed importance on how to convert green energy into usable power for human beings. There are many green energy conversion device have been provided in the market, and one of them is a power conversion device applied in a photo-voltaic (PV) power system. Such a power conversion device can be referred to as a PV inverter.

Refer to both of the FIGS. 1A and 1B. FIG. 1A is a circuit diagram showing a conventional power conversion device 100. FIG. 1B is a schematic diagram showing the function blocks of the power conversion device in FIG. 1A. The power conversion device 100 outputs an alternating current iout according to a direct-current (DC) voltage Ed and a grid voltage Vs.

The power conversion device 100 includes four active switch elements T21 to T24 at its output side. The four active switch elements T21 to T24 receive a control signal with relatively high frequency, i.e. a signal with a frequency higher than the frequency of the grid voltage, such as 50 to 60 Hz. In general, the control signal has a relatively high frequency, such as a frequency higher than 10 KHz, so as to avoid noise audible to the human ears. However, under the control of the control signal with relatively high frequency, the active switch elements T21 to T24 are switched on and off frequently, thus increase the power dissipation and decrease the conversion efficiency of the power conversion device 100. Therefore, how to enhance the power efficiency of the power conversion device is still a subject of the industrial endeavor.

BRIEF SUMMARY

Embodiments of a power conversion device and a control method thereof are provided, wherein a control signal having substantially the same frequency as an alternating-current (AC) voltage is utilized to convert a direct-current (DC) voltage to an alternating current corresponding to the AC voltage. Thus, the switching times of the active switch elements can be decreased, and the power dissipation can be reduced. Therefore, the conversion efficiency of the power conversion device can be enhanced.

Embodiment of a power conversion device is provided for converting a DC voltage to an alternating current corresponding to an AC voltage according to the AC voltage. The power conversion device includes a power conversion unit and an output unit. The power conversion unit is for converting the DC voltage to a high-frequency current having two envelops corresponding to the waveform of the AC voltage. The output unit includes an inductive circuit, a full-wave rectifying circuit, an inverter circuit, and a filter circuit. The inductive circuit is for providing two induced currents according to the high-frequency current, wherein one induced current and the high-frequency current are in phase, and the other one induced current and the high-frequency current are in antiphase. The full-wave rectifying circuit is for full-wave rectifying the two induced currents. The inverter circuit is for alternatively transferring the two full-wave rectified induced currents, so as to output an output current. The filter circuit is for filtering the output current to provide the alternating current.

Embodiment of a control method is provided to apply in a power conversion device which converts a DC voltage to an alternating current corresponding to an AC voltage according to a pulse width modulation (PWM) control signal and an output control signal. The method is for providing the PWM control signal and the output control signal. The method includes the following steps. First, obtain an alternating current command according to the product of the absolute value of the phasor of the AC voltage and a DC current command, wherein the alternating current command corresponds to the instantaneous value of the AC current. Next, obtain a feed-forward signal according to the product of the alternating current command and a gain value, wherein the feed-forward signal represents an angle, and the gain value corresponds to the ratio between the effective values of the AC voltage and the alternating current. Then, provide the PWM control signal according to an angular frequency and the angle represented by the feed-forward signal, wherein the angular frequency corresponds to the resonance frequency of the power conversion device. Finally, provide the output control signal according to the instantaneous value of the AC voltage.

Embodiment of a power conversion device is provided for converting a DC voltage to an alternating current corresponding to an AC voltage according to the AC voltage. The power conversion device includes a control unit, a power conversion unit, and an output unit. The control unit is for providing a PWM control signal and an output control signal according to the instantaneous value of the AC voltage. The power conversion unit is for converting the DC voltage to a high-frequency current having two envelops corresponding to the waveform of the AC voltage. The power conversion unit includes a DC to AC conversion circuit and immitance conversion circuit. The DC to AC conversion circuit includes a full-bridge inverter having four active switch elements. The four active switch elements are turned on correspondingly under control of the PWM control signal. The four active switch elements being turned on correspondingly are for converting the DC voltage to a converted voltage, wherein the amplitude of the converted voltage is substantially equal to the level of the DC voltage, and the duty cycle of the converted voltage corresponds to the absolute value of the instantaneous value of the AC voltage. The immitance conversion circuit is for converting the converted voltage to the high-frequency current by way of resonance. The output unit includes an inductive circuit, a full-wave rectifying circuit, an inverter circuit, and a filter circuit. The inductive circuit is for providing two induced currents according to the high-frequency current, wherein one induced current and the high-frequency current are in phase, and the other induced current and the high-frequency current are in antiphase. The full-wave rectifying circuit is for full-wave rectifying the two induced currents. The inverter circuit includes another two active switch elements which are turned on alternatively under control of the output control signal. The another two active switch elements being turned on alternatively are for transferring the two full-wave rectified induced currents, respectively, so as to output an output current via the inverter circuit. The filter circuit is for filtering the output current to provide the alternating current.

It is to be understood that both the foregoing general description and the following detailed description are exemplary and explanatory only and are not restrictive of the disclosed embodiments, as claimed.

DETAILED DESCRIPTION OF THE APPLICATION

An embodiment of the application provides a power conversion device for converting a direct current (DC) voltage to an alternating current corresponding to an alternating current (AC) voltage according to the AC voltage. The power conversion device of the embodiment can be connected in parallel to a power grid providing the AC voltage, so as to be applied in a photo-voltaic (PV) power system. The AC voltage mentioned above is, for example, the grid voltage. The alternating current corresponds to the AC voltage means that the alternating current provided by the power conversion device of the embodiment can be substantially synchronous with the AC voltage. An exemplary power conversion device will be made below as an example for elaborating the power conversion device and the control method thereof disclosed in the embodiments.

Figure 2:
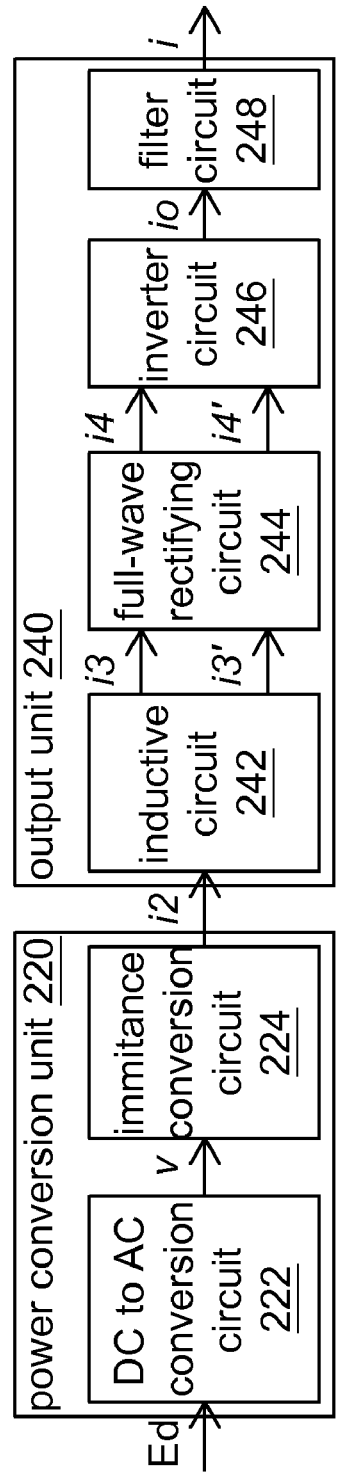
FIG. 2 is a block diagram showing a power conversion device according to an exemplary embodiment.

FIG. 2 is a block diagram showing a power conversion device 200 according to an exemplary embodiment. The power conversion device 200 includes a power conversion unit 220 and an output unit 240. The power conversion device 200 converts a DC voltage Ed to a high-frequency current i2. The high-frequency current i2 has two envelops corresponding to the waveform of the AC voltage e. For example, the waveform of the AC voltage e can be the sinusoidal waveform, and the high frequency current i2 may have two envelops with sinusoidal waveform, wherein the two envelops are substantially in antiphase.

The output unit 240 includes an inductive circuit 242, a full-wave rectifying circuit 244, an inverter circuit 246, and a filter circuit 248. The inductive circuit 242 is for providing two induced currents i3 and i3' according to the high-frequency current i2. The high-frequency current i2 and one of the two induced currents i3 and i3' are in phase, and the high-frequency current i2 and the other one of the two induced currents i3 and i3' are in antiphase. The full-wave rectifying circuit 244 is for full-wave rectifying the two induced currents i3 and i3'. The inverter circuit 246 is for alternatively transferring the two full-wave rectified induced currents i4 and i4', so as to output an output current io.

The filter circuit 248 is for filtering the output current io to provide the alternating current i. In the exemplary embodiment, because the two envelops of the high frequency current i2 have substantially the same waveform, such as sinusoidal waveform, as the AC voltage e, the fundamental frequency and the phase of the output current io are substantially equal to the frequency and the phase of the AC voltage e, respectively. The filter circuit 248 can be, for example, used to output the fundamental frequency component of the output current io. Thus, the output current io is turned into the alternating current i which is substantially synchronous with the AC voltage e after filtering by the filter circuit 248.

Figure 3:
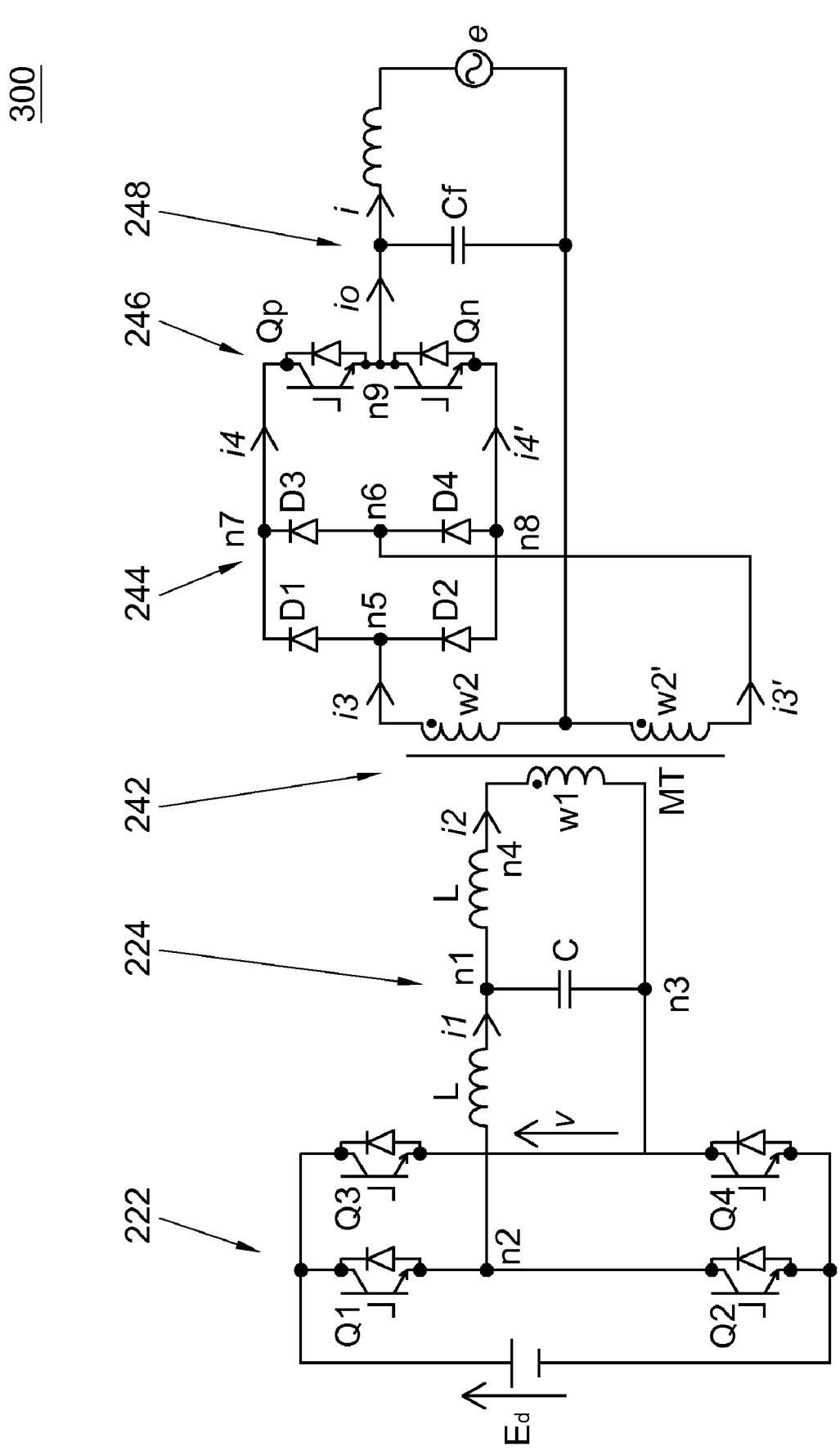
FIG. 3 is a circuit diagram showing an example of the power conversion device in FIG. 2.
Figure 4:
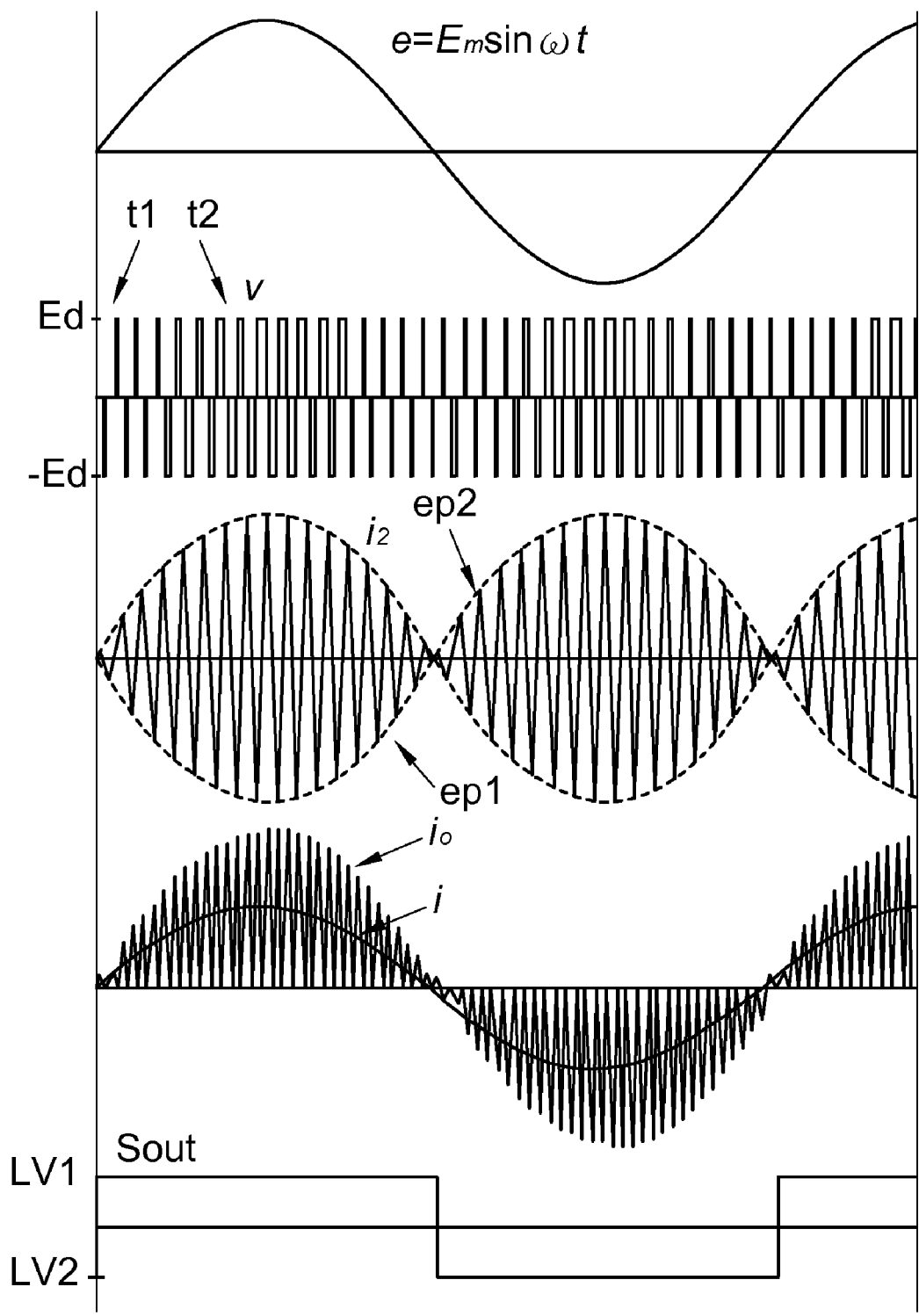
FIG. 4 is a waveform diagram showing an example of a number of power signals which the power conversion device in FIG. 3 receives and provides.

An embodiment is made below to detail the power conversion device, and to demonstrate how the power conversion device provides the alternating current i which is substantially synchronous with the AC voltage e. Refer to both of the FIGS. 3 and 4. FIG. 3 is a circuit diagram showing an example of the power conversion device in FIG. 2. FIG. 4 is a waveform diagram showing an example of a number of power signals which the power conversion device in FIG. 3 receives and provides. In this example, it is depicted that the alternating current i and the AC voltage e both have sinusoidal waveform and are substantially synchronous with each other.

The power conversion unit 220 may include a DC to AC conversion circuit 222 and immitance conversion circuit 224. The DC to AC conversion circuit 222 is for converting the DC voltage Ed to a converted voltage v. The amplitude of the converted voltage v is substantially equal to the level of the DC voltage Ed. For example, as shown in FIG. 4, the converted voltage v can be a bipolar pulse wave with its amplitude equal to the level of the DC voltage Ed.

The duty cycle of the converted voltage v corresponds to the absolute value of the instantaneous value of the AC voltage e. The instantaneous value of the AC voltage e represents the product between the amplitude and phasor of the AC voltage e, e.g.: $e=E_m \sin \omega t$, where $E_m$ denotes the amplitude, and $\sin \omega t$ denotes the phasor. In practical, the duty cycle of the converted voltage v is in direct proportion to the absolute value of the instantaneous value of the AC voltage e. For example, referring to FIG. 4, during the positive half of the AC voltage e, the duty cycle of the converted voltage v decreases as the absolute value of the instantaneous value of the AC voltage e lowers as shown in time period t1; correspondingly, the duty cycle of the converted voltage v increases as the absolute value of the instantaneous value of the AC voltage e rises as shown in time period t2. The duty cycle of the converted voltage v during the negative half of the AC voltage e is varied in a similar way.

In practical, the DC to AC conversion circuit 222 includes, for example, a full-bridge inverter having four active switch elements Q1 to Q4. The four active switch elements Q1 to Q4 are turned on correspondingly under control of a pulse width modulation (PWM) control signal Spwm (not shown in FIG. 3). The four active switch elements Q1 to Q4 being turned on correspondingly are for converting the DC voltage Ed to the converted voltage v depicted in FIG. 4.

The immitance conversion circuit 224 is for converting the converted voltage v to the high-frequency current i2 by way of resonance, wherein the waveform of the high-frequency current i2 is depicted in FIG. 4. Because the duty cycle of the converted voltage v is in direct proportion to the absolute value of the instantaneous value of the AC voltage e, the two envelops ep1 and ep2 of the high-frequency current i2 provided by the immitance conversion circuit 224 will have the same waveform as the AC voltage e, e.g. the sinusoidal waveform in this example, and the two envelops ep1 and ep2 are in antiphase, as shown in FIG. 4.

Referring to FIG. 3, in practical, the immitance conversion circuit 224 includes, for example, two inductors L and a capacitor C. The two inductors L are connected in series. The capacitor C is coupled with one end to the series-connected end of the two inductors L, as shown by the end n1. One end of the two series-connected inductors L and the other end of the capacitor C are for receiving the converted voltage v, as shown by the ends n2 and n3. The other end of the two series-connected inductors L and the other end of the capacitor C are coupled to the inductive circuit 242 and serve as two ends for providing the high-frequency current i2, as shown by the ends n3 and n4.

The inductive circuit 242 includes, for example, a transformer MT. The transformer MT includes a primary winding w1 and two secondary windings w2 and w2', wherein the primary winding w1 is for receiving the high-frequency current i2, and the two secondary windings w2 and w2' are for providing two induced currents i3 and i3'. In practical, a turns-ration between the primary winding w1 and one of the two secondary windings w2 and w2' (such as the secondary winding w2) is substantially equal to a turns-ration between the primary winding w1 and the other one of the two secondary windings w2 and w2' (such as the secondary winding w2'). That is, the two secondary windings w2 and w2' have substantially the same turns. For example, the turns-ratio between the primary winding w1 and the two secondary windings w2 and w2' can be n:1:1 or 1:n:n, wherein n is a value larger than 1.

The full-wave rectifying circuit 244 includes four passive switch elements D1 to D4, two passive switch elements D1 and D2 are connected in series and the other two passive switch elements D3 and D4 are connected in series. Two series-connected ends, as shown by the ends n5 and n6, of the two passive switch elements D1 and D2 as well as the other two passive switch elements D3 and D4 are coupled to the inductive circuit 242 for receiving the two induced currents i3 and i3'. The passive switch elements D1 and D2 are connected in parallel to the passive switch elements D3 and D4, while their parallel-connected ends are coupled to the inverter circuit 246, and serve as two ends for providing the two full-wave rectified induced currents i4 and i4', as shown by the ends n7 and n8.

In practical, the inverter circuit 246 includes two active switch elements Qp and Qn. The two active switch elements Qp and Qn are connected in series. Two ends of the two series-connected active switch elements Qp and Qn are coupled to the full-wave rectifying circuit 244, and serve as two ends for receiving the two full-wave rectified induced currents i4 and i4', as shown by the ends n7 and n8. The series-connected end of the two active switch elements Qp and Qn is coupled to the filter circuit 248, and serves as one end for providing the output current io, as shown by the end n9.

The two active switch elements Qp and Qn are alternately turned on under control of an output control signal Sout (now shown in FIG. 3). The active switch elements Qp and Qn being alternately turned on are for transferring the two full-wave rectified induced current i4 and i4', so as to make the inverter circuit 246 output the output current io.

The filter circuit 248 includes, for example, a capacitor Cf, and the operation frequency of the capacitor Cf is substantially equal to the frequency of the AC voltage e. Because the fundamental frequency and the phase of the output current io are substantially equal to the frequency and the phase of the AC voltage e, respectively, the capacitor Cf passes the fundamental frequency of the output current io, and rejects (or attenuates) the harmonics of the output current io outside a range around the operation frequency. Therefore, the output current io passing though the filter circuit 248 turns into the alternating current i which is substantially synchronous with the AC voltage e, as shown in FIG. 3.

Besides, another exemplary embodiment further provides a control method applied in a power conversion device, such as the power conversion device 200 in FIG. 2 or the power conversion device 300 in FIG. 3. The method is for providing the PWM control signal and the output control signal mentioned above.

Figure 5A:
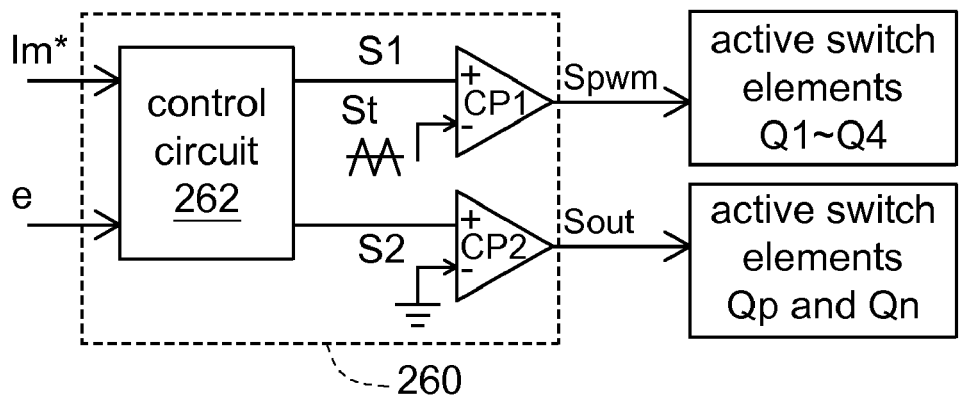
FIG. 5A is a circuit diagram showing a portion of the power conversion device in FIG. 3.
Figure 5B:
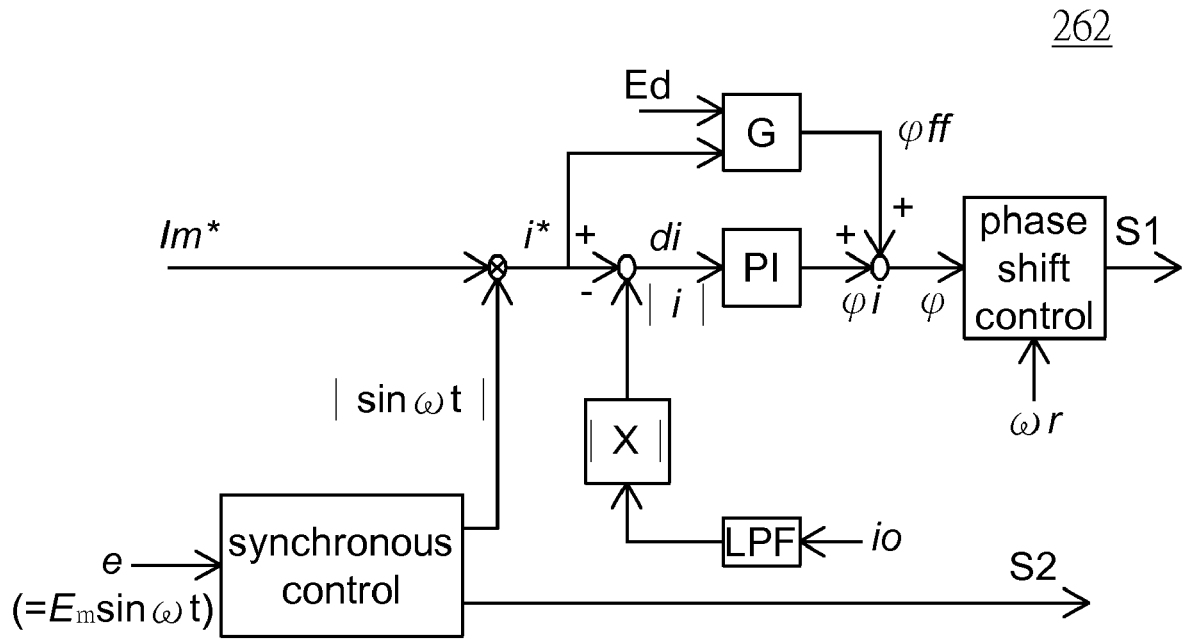
FIG. 5B is a function block diagram of the control circuit in FIG. 5A.

Refer to both of the FIGS. 5A and 5B. FIG. 5A is a circuit diagram showing a portion of the power conversion device in FIG. 3. FIG. 5B is a function block diagram of the control circuit in FIG. 5A. It is described here that the power conversion device 200 may further include a control unit 260. The control unit 260 can be used for executing the control method of this embodiment, so as to provide the PWM control signal Spwm and the output control signal Sout mentioned above according to the instantaneous value of the AC voltage e. In this way, the power conversion device 200 can convert the DC voltage Ed to the alternating current i corresponding to the AC voltage e according to the PWM control signal Spwm and the output control signal Sout. How the control unit 260 executes the control method to provide the PWM control signal Spwm and the output control signal Sout is described below.

In FIGS. 5A and 5B, the control unit 260 includes a control circuit 262 and two comparators CP1 and CP2. The control unit 260 receives a direct current command Im* and the AC voltage e, and thus to provide the PWM control signal Spwm and the output control signal Sout mentioned above.

Refer to the function blocks in FIG. 5B. First, as shown in the block of "synchronous control", the control circuit 262 converts the AC voltage e to its absolute value of phasor $|\sin \omega t|$. Next, the control circuit 262 obtains an alternating current command i* according to the product of the absolute value of phasor $|\sin \omega t|$ of the AC voltage e and the DC current command Im*, wherein the alternating current command i* corresponds to the absolute value of the instantaneous value of the AC current i. That is, in an exemplary embodiment, the alternating current command i* can be used to determine the effective value of the alternating current i provided by the power conversion device 200.

The feed-forward loop in the function blocks is illustrated as follows. The control unit 260 obtains a feed-forward signal $\phi ff$ according to the product of the alternating current command i* and a gain value, such as the gain value denoted in the function block "G", while the feed-forward signal $\phi ff$ represents an angle. The gain value corresponds to the ratio between the effective values of the AC voltage e and the alternating current i.

As shown in function block "phase shift control", the control unit 260 provides the PWM control signal Spwm mentioned above according to an angular frequency $\omega r$ and the angle represented by the feed-forward signal $\phi ff$, so as to shift the phase. The angular frequency $\omega r$ corresponds to the resonance frequency of the immitance conversion circuit 224. For example, the frequency of the angular frequency $\omega r$ can be the resonance frequency between the two inductors L and the capacitor C of the immitance conversion circuit 224 in FIG. 3.

In practical, in the course of providing the PWM control signal Spwm, the control circuit 262 of the control unit 260 provides a sinusoidal signal S1 according to the feed-forward signal φff and the angular frequency ωr. Then, the comparator CP1 of the control unit 260 provides the PWM control signal Spwm according to the sinusoidal signal S1 and a triangular signal St. The triangular signal St may, for example, have a frequency of about 20 KHz.

Moreover, the control unit 260 can further adjust the angle represented by the feed-forward signal φff according to the level of the DC voltage Ed, and thus to adjust the PWM control signal Spwm. Therefore, the DC to AC conversion circuit 222 can adjust the duty cycle of the converted voltage v according to the level of the DC voltage Ed under control of the PWM control signal Spwm. For example, if the level of the DC voltage Ed lowers, the DC to AC conversion circuit 222 increases the duty cycle of the converted voltage v, so that the immitance conversion circuit 224 can keep the magnitude of the effective value of the high-frequency current i2.

The feed-back loop in the function blocks is illustrated as follows. The control unit 260 further obtains a current difference di according to the difference between the value represented by the alternating current command i* and the absolute value of the instantaneous value of the AC current i. For example, in FIG. 5B, the control unit 260 feeds the output current io back, and then utilizes the low pass filter, shown in function block "LPF", to retrieve the fundamental frequency component of the output current io, so as to obtain the alternating current i mentioned above. Next, the control unit 260 calculates the absolute vale of the alternating current i (as shown in function block "|X|"), and obtains the absolute value of the instantaneous value of the alternating current i, which is denoted by |i|.

As shown in function block "PI", the control unit 260 further converts the current difference di to a feed-back signal φi by way of proportional-integral (PI), wherein the feed-back signal φi represents another angle. In practical, the angle represented by the feed-back signal φi is about 3% to 5% of the angle represented by the feed-forward signal φff. The sum of the feed-forward signal φff and the feed-back signal φi are denoted by the symbol φ. The control unit 260 provides the PWM control signal Spwm according to the sum of the two angles, i.e. φ, and the angular frequency ωr.

Besides, the control unit 260 can, for example, provide the output control signal Sout according to the instantaneous value of the AC voltage e. For example, as shown in FIG. 4, when the instantaneous value of the AC voltage e is positive, the output control signal Sout has a first level LV1 which may be a level for turning on one of the two active switch elements Qp and Qn (e.g. the active switch elements Qp); and when the instantaneous value of the AC voltage e is negative, the output control signal Sout has a second level LV2 which may be a level for turning on the other one of the two active switch elements Qp and Qn (e.g. the active switch elements Qn).

In practical, in the course of providing the output control signal Sout, the control unit 260 provides a sinusoidal signal S2 according to the polarity of the instantaneous value of the AC voltage e. Then, the comparator CP2 of the control unit 260 provides the output control signal Sout according to the sinusoidal signal S2 and a reference signal, such as the grounding signal shown in FIG. 5A. The output control signal Sout has substantially the same frequency, such as a frequency of 50 to 60 Hz, as the AC voltage e.

Figure 6A:
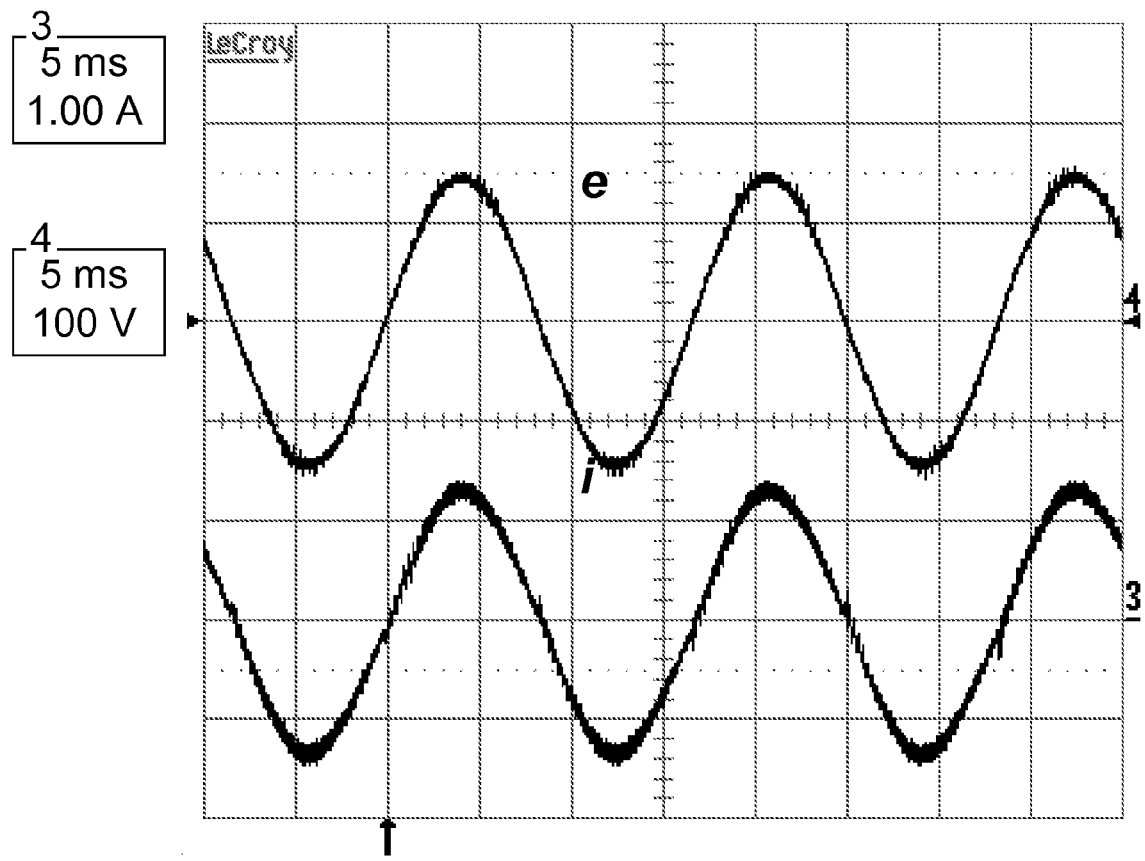
FIG. 6A is the waveform diagram showing the AC voltage and the alternating current of the power conversion device being measured according to an exemplary embodiment.

FIG. 6A is the waveform diagram showing the AC voltage and the alternating current of the power conversion device being measured according to an exemplary embodiment. As can be seen in FIG. 6A the power conversion device according to the exemplary embodiment can provide the alternating current i which corresponds to the AC voltage e. Exemplarily, the alternating current i is synchronous with the AC voltage e in substantial. As a result, if the power conversion device according to the exemplary embodiment is coupled to the power grid which provides the grid voltage served as the AC voltage e, the power conversion device can provide the alternating current i which is substantially synchronous with the AC voltage e, and thus increase the power factor for the output power. Exemplarily, the power factor is about 1.

As disclosed in the exemplary embodiment, through calculating the product of the grid voltage and a direct current command Im*, the power conversion device can provide the alternating current command i*. In this way, the power conversion device can be implemented without utilizing a conventional zero-crossing detective circuit, thus reduce the number of the required circuit elements.

Figure 1A:
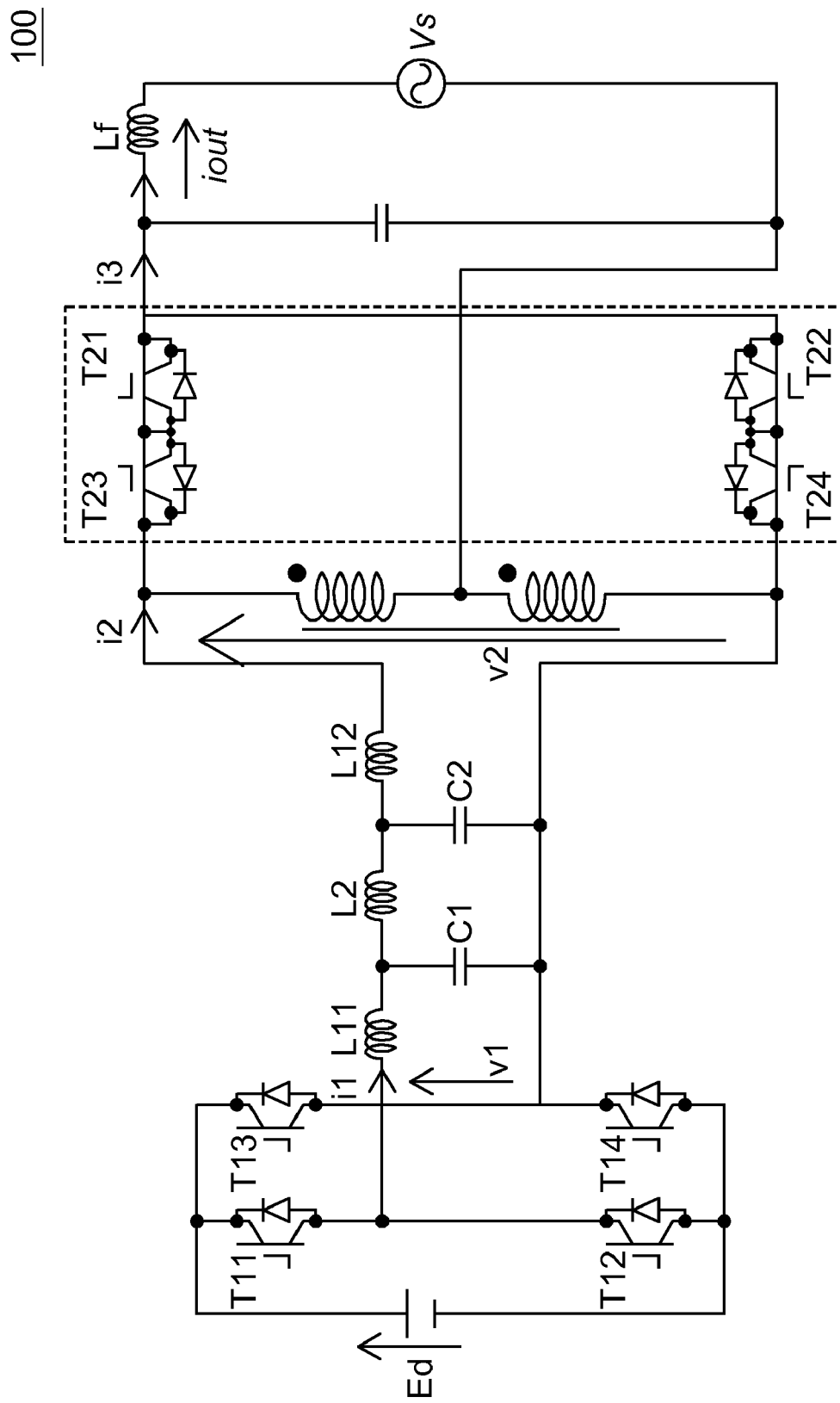
FIG. 1A (Prior Art) is a circuit diagram showing a conventional power conversion device.
Figure 1B:
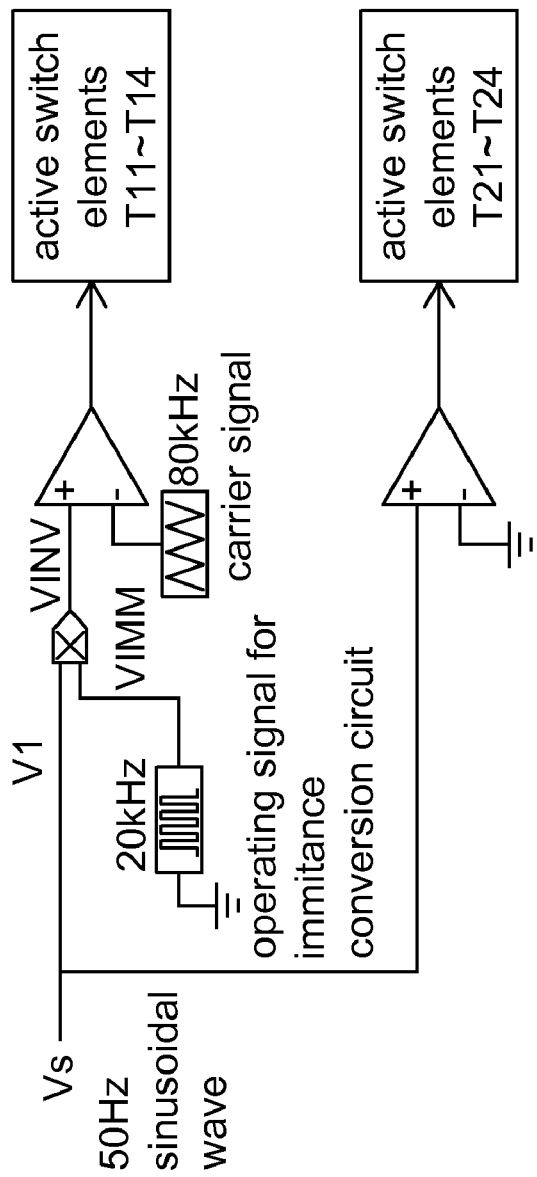
FIG. 1B (Prior Art) is a schematic diagram showing the function blocks of the conventional power conversion device in FIG. 1A.

In addition, at the output side, i.e. the side for providing the alternating current, the conventional power conversion device utilizes four active switch elements Q5 to Q8 in its inverter circuit, as shown in FIG. 1A. However, as shown in FIG. 3, the inverter circuit 246 of the power conversion device 300 in the exemplary embodiment utilizes two active switch elements Qp and Qn to provide the alternating current i. Therefore, the power conversion device 300 in the exemplary embodiment can reduce the number of the required circuit elements, lower the cost, and achieve low system complexity.

Moreover, in FIG. 1A, the conventional power conversion device utilizes a signal with a frequency higher than 10 KHz to control the active switch elements Q5 to Q8 in the inverter circuit. Correspondingly, in the exemplary embodiment, the power conversion device 300 utilizes a signal, such as the output control signal Sout in FIG. 4, with relatively low frequency, e.g. the frequency of grid voltage, which is about 50 to 60 Hz, to control the active switch elements Qp and Qn in the inverter circuit 246. Hence, the switching times of the active switch elements can be decreased, thus reduce the power dissipation and enhance the conversion efficiency of the power conversion device. Furthermore, the power conversion device in this embodiment utilizes a reduced number of the circuit elements, such as the active switch elements, and is in control of the active switch elements at relatively low frequency, so that the complexity of the function blocks is thus reduced.

For an application in practical, the power conversion device 300 in the exemplary embodiment can be applied in the PV power system which can be connected in parallel to the power grid. As compared with the conventional power conversion device applied in the PV power system, the power conversion device disclosed in the exemplary embodiment has higher conversion efficiency. The reason may be as follows. The conventional power conversion device, such as the power conversion device 100 in FIG. 1A, usually utilizes a high DC voltage, such as a DC voltage higher than 100 Volt. In order to provide the high DC voltage, the PV modules in the conventional power conversion device are connected in series or in parallel with each other, which forms a PV array with different arrangement of these PV modules. However, if one of these PV modules being connected in series or in parallel is out of function, or if the maximum power points of each PV modules are different from each other (e.g. there is partial shadow on the PV modules which affects the DC voltage being provided by the PV modules), the output power of the whole PV power system is thus affected. At this time, the conversion efficiency of the power conversion device may be degraded.

The power conversion device provided in the exemplary embodiment can be integrated with each one PV modules, so as to convert the DC voltage provided by each PV modules into respective output current, thereby increase the operation stability of the system, and enhance the reliability and conversion efficiency of the system. Moreover, the power conversion device can be integrated with each PV modules, so that every PV modules can be performed on its respective maximum power point with respect to its corresponding power conversion device, thus enhance the conversion efficiency as a whole.

Figure 6B:
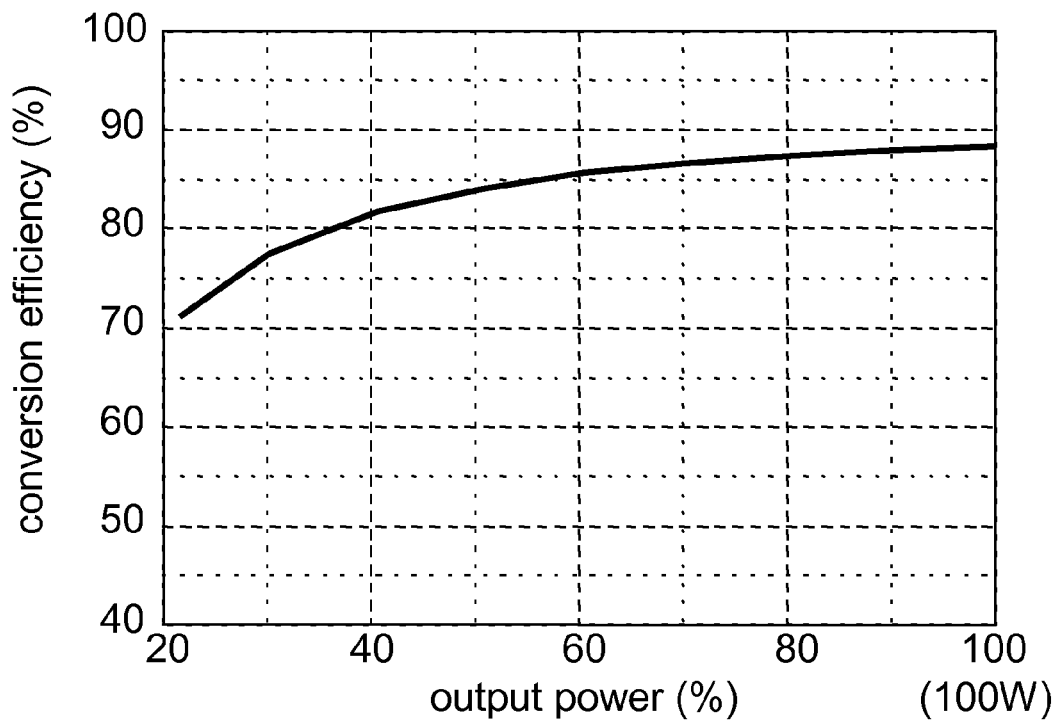
FIG. 6B shows an example of the relationship between the output power and the conversion efficiency of the power conversion device according to an exemplary embodiment.

The output power and the conversion efficiency are provided below when the power conversion device of the exemplary embodiment is applied in a PV module. FIG. 6B shows an example of the relationship between the output power and the conversion efficiency of the power conversion device according to an exemplary embodiment. In this example, the PV module provides an output power about 100 Watt (W). As can be seen in FIG. 6B the conversion efficiency enhances when the output power of the power conversion device increases. For example, the conversion efficiency reaches about 90% when the output power of the power conversion device increases to a value about 100 W.

Moreover, because the power conversion in the exemplary embodiment can be integrated with a single PV module, the normal rated power (e.g. 100 W) outputted by the one power conversion device is lower than the overall normal rated power (e.g. 4 KW) outputted by the conventional power conversion device. Therefore, with the power conversion device of the exemplary embodiment, the PV power system can be installed by a set of thinner cable and apparatus with lower capacity, thereby reduce the power loss on the cable and the system circuit, and further enhance the conversion efficiency of the system. In addiction, in the of this invention embodiment, the DC voltage Ed for use in the power conversion device does not require a high voltage level, thus improve the security on usage and installation.

Furthermore, in convention, in order for the power conversion device to be connected to the power grid in parallel, a transformer, especially a low-frequency transformer, is usually required. In the of this invention embodiment, the power conversion device utilizes the transformer MT shown in FIG. 3 which is for receiving the high-frequency current i2. Therefore, the transformer for use in the power conversion device can be a high-frequency transformer, thereby reduce the volume of the transformer in the power conversion device. That is, the power conversion device can be designed with a reduced volume, and the cost can also be lowered.

According to the description mentioned above, the power conversion device disclosed in the exemplary embodiments has many features which are listed for illustration and without limitation below.

1. In an embodiment, the power conversion device can be implemented without employing the conventional zero-crossing detective circuit, thereby reduce the required circuit elements.

2. In an embodiment, the power conversion device can provide an alternating current which is substantially synchronous with the grid voltage, thereby increase the power factor for the output power.

3. In an embodiment, the switching times of the switch elements can be decreased, thus reduce the power dissipation and enhance the conversion efficiency of the power conversion device.

4. In an embodiment, the power conversion device can be integrated with each PV modules, thus increase the operation stability of the system and enhance the reliability and conversion efficiency of the system.

5. In an embodiment, the power conversion device can be installed by a set of thinner cable and apparatus with lower capacity, thereby reduce the power loss on the cable and the system circuit, and further enhance the conversion efficiency of the system.

6. In an embodiment, the DC voltage does not require a high voltage level, thus improve the security on usage and installation.

7. In an embodiment, the volume of the transformer can be reduced, that is, the power conversion device can be designed with a reduced volume, and the cost can also be lowered.

According to the power conversion device and the control method thereof disclosed in the above-mentioned embodiments, a control signal having substantially the same frequency as an AC voltage is utilized to convert a DC voltage to an alternating current corresponding to the AC voltage. Thus, the switching times of the active switch elements can be decreased, thereby reduce the power dissipation and enhance the conversion efficiency of the power conversion device.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A power conversion device, for converting a direct-current (DC) voltage to an alternating current corresponding to an alternating-current (AC) voltage according to the AC voltage, comprising:

a power conversion unit, for converting the DC voltage to a high-frequency current having two envelops corresponding to the waveform of the AC voltage, the power conversion unit comprising:

a DC to AC conversion circuit, for converting the DC voltage to a converted voltage, wherein the amplitude of the converted voltage is substantially equal to the level of the DC voltage, and the duty cycle of the converted voltage corresponds to the absolute value of the instantaneous value of the AC voltage, wherein the DC to AC conversion circuit comprises a full-bridge inverter having four active switch elements, the four active switch elements are turned on correspondingly under control of a pulse width modulation (PWM) control signal, and the four active switch elements being turned on correspondingly are for converting the DC voltage to the converted voltage; and an immitance conversion circuit, for converting the converted voltage to the high-frequency current by way of resonance;

an output unit, comprising:

an inductive circuit, for providing two induced currents according to the high-frequency current, wherein one induced current and the high-frequency current are in phase, and the other induced current and the high-frequency current are in antiphase;

a full-wave rectifying circuit, for full-wave rectifying the two induced currents;

an inverter circuit, for alternatively transferring the two full-wave rectified induced currents so as to output an output current; and a filter circuit, for filtering the output current to provide the alternating current; and a control unit, for providing the PWM control signal according to an instantaneous value of the AC voltage;

wherein, the control unit obtains an alternating current command according to a product of the absolute value of the phasor of the AC voltage and a DC current command, and the alternating current command corresponds to an instantaneous value of the alternating current;

wherein, the control unit further obtains a feed-forward signal according to a product of the alternating current command and a gain value, the feed-forward signal represents an angle, and the gain value corresponds to a ratio between effective values of the AC voltage and the alternating current; and wherein, the control unit further provides the PWM control signal according to an angular frequency and the angle represented by the feed-forward signal, and the angular frequency corresponds to a resonance frequency of the immitance conversion circuit.

2. The power conversion device according to claim 1, wherein the fundamental frequency and the phase of the output current are substantially equal to the frequency and the phase of the AC voltage, respectively.

3. The power conversion device according to claim 1, wherein the duty cycle of the converted voltage is in direct proportion to the absolute value of the instantaneous value of the AC voltage.

4. The power conversion device according to claim 1, wherein the DC to AC conversion circuit is further for adjusting the duty cycle of the converted voltage according to the level of the DC voltage.

5. The power conversion device according to claim 1, wherein the control unit further adjusts the angle represented by the feed-forward signal according to the level of the DC voltage.

6. The power conversion device according to claim 1, wherein the control unit further obtains a current difference according to the difference between the absolute value of the instantaneous value of the AC current and the value represented by the alternating current command;

wherein, the control unit further converts the current difference to a feed-back signal by way of proportional-Integral (PI) control, and the feed-back signal represents another angle; and wherein, the control unit provides the PWM control signal according to the angular frequency and a sum of the two angles represented by the feed-forward signal and the feed-back signal.

7. The power conversion device according to claim 1, wherein the immitance conversion circuit comprises:

two inductors, connected in series; and a capacitor, coupled with one end to the series-connected end of the two inductors;

wherein, one end of the two series-connected inductors and the other end of the capacitor are for receiving the converted voltage, and the other end of the two series-connected inductors and the other end of the capacitor are coupled to the inductive circuit and serve as two ends for providing the high-frequency current.

8. The power conversion device according to claim 1, wherein the inductive circuit comprises a transformer which comprises:

a primary winding, for receiving the high-frequency current; and two secondary windings, for providing the two induced currents, respectively.

9. The power conversion device according to claim 8, wherein a turns ratio between the primary winding and one of the two secondary windings is substantially equal to a turns ration between the primary winding and the other one of the two secondary windings.

10. The power conversion device according to claim 1, wherein the full-wave rectifying circuit comprises four passive switch elements, two of the four passive switch elements are connected in series and the other two of the four passive switch elements are connected in series, two series-connected ends of the two passive switch elements and the other two passive switch elements are coupled to the inductive circuit for receiving the two induced currents, the two passive switch elements are connected in parallel to the other two passive switch elements, two parallel-connected ends of the two passive switch elements and the other two passive switch elements are coupled to the inverter circuit, and the two parallel-connected ends serve as two ends for providing the two full-wave rectified induced currents.

11. The power conversion device according to claim 1, wherein the inverter circuit comprises:

two active switch elements, being alternately turned on under control of an output control signal;

wherein, the active switch elements being alternately turned on are for transferring the two full-wave rectified induced current, so as to make the inverter circuit output the output current.

12. The power conversion device according to claim 11, further comprising:

a control unit, for providing the output control signal according to the instantaneous value of the AC voltage.

13. The power conversion device according to claim 12, wherein the control unit provides the output control signal according to the polarity of the instantaneous value of the AC voltage;

wherein, when the polarity of the instantaneous value of the AC voltage is positive, the output control signal has a first level and is for turning on one of the two active switch elements; and when the polarity of the instantaneous value of the AC voltage is negative, the output control signal has a second level and is for turning on the other one of the two active switch elements.

14. The power conversion device according to claim 11, wherein the two active switch elements are connected in series, two ends of the two series-connected active switch elements are coupled to the full-wave rectifying circuit and serve as two ends for providing the two full-wave rectified induced currents, and the series-connected end of the two active switch elements is coupled to the filter circuit and serves as one end for providing the output current.

15. The power conversion device according to claim 1, wherein the filter circuit comprises a capacitor, and the operation frequency of the capacitor is substantially equal to the frequency of the AC voltage.

16. A control method applied in a power conversion device, wherein the power conversion device converts a direct-current (DC) voltage to an alternating current corresponding to an alternating-current (AC) voltage according to a pulse width modulation (PWM) control signal and an output control signal, the method is for providing the PWM control signal and the output control signal, and the method comprises:

obtaining an alternating current command according to a product of the absolute value of the phasor of the AC voltage and a DC current command, the alternating current command corresponding to an instantaneous value of an alternating current;

obtaining a feed-forward signal according to a product of the alternating current command and a gain value, the feed-forward signal representing an angle, and the gain value corresponding to a ratio between effective values of the AC voltage and the alternating current;

providing the PWM control signal according to an angular frequency and the angle represented by the feed-forward signal, the angular frequency corresponding to a resonance frequency of the power conversion device; and providing the output control signal according to an instantaneous value of the AC voltage.

17. The control method according to claim 16, wherein the fundamental frequency and the phase of the alternating current are substantially equal to the frequency and the phase of the AC voltage, respectively.

18. The control method according to claim 16, further comprising:

adjusting the angle represented by the feed-forward signal according to the level of the DC voltage, so as to adjust the PWM control signal.

19. The control method according to claim 16, further comprising:

obtaining a current difference according to a difference between the value represented by the alternating current command and the absolute value of the instantaneous value of the alternating current;

converting the current difference to a feed-back signal by way of proportional-Integral (PI) control, the feed-back signal representing another angle; and wherein, the step of providing the PWM control signal comprises:

providing the PWM control signal according to the angular frequency and the sum of the two angles represented by the feed-forward signal and the feed-back signal.

20. The control method according to claim 16, wherein the step of providing the output control signal comprises:

providing the output control signal according to the polarity of the instantaneous value of the AC voltage;

wherein, when the polarity of the instantaneous value of the AC voltage is positive, the output control signal has a first level and is for turning on one of two active switch elements; and when the polarity of the instantaneous value of the AC voltage is negative, the output control signal has a second level and is for turning on the other one of the two active switch elements.

* * * * *